US011398660B2

(12) United States Patent
Kim et al.

(10) Patent No.: US 11,398,660 B2
(45) Date of Patent: Jul. 26, 2022

(54) FLAME RETARDANT SEPARATOR HAVING ASYMMETRIC STRUCTURE FOR SECONDARY BATTERIES

(71) Applicant: LG CHEM, LTD., Seoul (KR)

(72) Inventors: Min Ji Kim, Daejeon (KR); Kwan Woo Nam, Daejeon (KR); Je An Lee, Daejeon (KR); Young Bok Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 253 days.

(21) Appl. No.: 16/646,657

(22) PCT Filed: Apr. 17, 2019

(86) PCT No.: PCT/KR2019/004649
§ 371 (c)(1),
(2) Date: Mar. 12, 2020

(87) PCT Pub. No.: WO2019/203571
PCT Pub. Date: Oct. 24, 2019

(65) Prior Publication Data
US 2020/0274128 A1    Aug. 27, 2020

(30) Foreign Application Priority Data
Apr. 18, 2018  (KR) .................. 10-2018-0044979

(51) Int. Cl.
*H01M 50/449* (2021.01)
*H01M 50/431* (2021.01)
(Continued)

(52) U.S. Cl.
CPC ......... *H01M 50/449* (2021.01); *H01M 4/131* (2013.01); *H01M 4/623* (2013.01);
(Continued)

(58) Field of Classification Search
CPC .......... H01M 10/052; H01M 10/0525; H01M 10/4235; H01M 2004/021;
(Continued)

(56) References Cited

U.S. PATENT DOCUMENTS 8,426,053 B2   4/2013   Lee et al.
10,305,079 B2  5/2019   Ha et al.
(Continued)

FOREIGN PATENT DOCUMENTS

CN   101689624 A   3/2010
CN   102160211 A   8/2011
(Continued)

OTHER PUBLICATIONS

Extended European Search Report, dated Sep. 28, 2020, for European Application No. 15787800.2.
(Continued)

*Primary Examiner* — Carlos Barcena
(74) *Attorney, Agent, or Firm* — Birch, Stewart, Kolasch & Birch, LLP (57) ABSTRACT

A flame retardant separator for secondary batteries having an asymmetric structure, and more particularly, a flame retardant separator for secondary batteries having an asymmetric structure in which a hydroxide-based inorganic flame retardant is coated on only a surface facing a positive electrode. The present invention provides a separator, which is capable of preventing the risk of lithium ions predominantly precipitated from a negative electrode in a lithium secondary battery, enhancing the flame retardant effect, and maintaining electrochemical properties in contrast with a conventional separator coated with inorganic matters, and a lithium secondary battery including the same.

11 Claims, 4 Drawing Sheets

(51) Int. Cl.
*H01M 4/62* (2006.01)
*H01M 4/131* (2010.01)
*H01M 10/0525* (2010.01)
*H01M 4/02* (2006.01)

(52) U.S. Cl.
CPC ..... *H01M 10/0525* (2013.01); *H01M 50/431* (2021.01); *H01M 2004/021* (2013.01); *H01M 2004/027* (2013.01); *H01M 2004/028* (2013.01)

(58) Field of Classification Search
CPC ..... H01M 2004/027; H01M 2004/028; H01M 2220/20; H01M 2220/30; H01M 4/131; H01M 4/623; H01M 50/417; H01M 50/431; H01M 50/446; H01M 50/449; H01M 50/457
See application file for complete search history.

(56) References Cited

U.S. PATENT DOCUMENTS

| | | | |
|---|---|---|---|
| 2010/0173187 A1 | 7/2010 | Nishikawa et al. | |
| 2011/0143185 A1 | 6/2011 | Nishikawa | |
| 2012/0015254 A1 | 1/2012 | Lee et al. | |
| 2013/0316219 A1 | 11/2013 | Ha et al. | |
| 2015/0050544 A1* | 2/2015 | Nam | H01M 50/449 429/145 |

FOREIGN PATENT DOCUMENTS

| | | | | |
|---|---|---|---|---|
| CN | 102668172 A | | 9/2012 | |
| CN | 103579559 A | | 2/2014 | |
| CN | 103814459 A | | 5/2014 | |
| CN | 105185936 A | | 12/2015 | |
| EP | 2549566 A | | 1/2013 | |
| EP | 3667770 A1 | | 6/2020 | |
| JP | 2006-269359 A | | 10/2006 | |
| JP | 2011-113921 A | | 6/2011 | |
| KR | 10-2011-0057079 A | | 5/2011 | |
| KR | 10-2012-0079515 | * | 7/2012 | ............ H01M 10/04 |
| KR | 10-2012-0079515 A | | 7/2012 | |
| KR | 10-2013-0075672 A | | 7/2013 | |
| KR | 10-2015-0019991 A | | 2/2015 | |
| KR | 10-2016-0097537 A | | 8/2016 | |
| KR | 10-2017-0019522 | * | 2/2017 | ............ H01M 2/16 |
| KR | 10-2017-0019522 A | | 2/2017 | |

OTHER PUBLICATIONS

International Search Report issued in PCT/KR2019/004649 (PCT/ISA/210), dated Jul. 25, 2019.

Wang et al., "Pyrogallic acid coated polypropylene membranes as separators for lithium-ion batteries", Journal of Materials Chemistry A, vol. 3, Issue 41, 2015, pp. 20535-20540.

* cited by examiner

FLAME RETARDANT SEPARATOR HAVING ASYMMETRIC STRUCTURE FOR SECONDARY BATTERIES

TECHNICAL FIELD

The present invention relates to a flame retardant separator having an asymmetric structure for secondary batteries, and more particularly to a flame retardant separator having an asymmetric structure for secondary batteries in which a hydroxide-based inorganic flame retardant is coated only on a surface facing a positive electrode.

BACKGROUND ART

With the recent trends toward reducing the weight and increasing the functionality of portable devices, such as smartphones, laptop computers, tablet PCs, and portable game machines, the demand for a secondary battery serving as a driving power source thereof is increasing. In the past, nickel-cadmium, nickel-hydrogen, and nickel-zinc batteries have been used, but lithium secondary batteries, which have high operating voltage and high energy density per unit weight, are most frequently used at present.

In the case of lithium secondary batteries, the demand for lithium secondary batteries has increased with the growth of markets related to the portable device market. Lithium secondary batteries have also come to be used as the power sources for electric vehicles (EV) and hybrid electric vehicles (HEV).

A lithium secondary battery is configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

The separator is one of the most important factors that affect the performance and the lifespan of a secondary battery. It is necessary for the separator to electrically isolate the positive electrode and the negative electrode from each other and to exhibit high ion permeability, high mechanical strength and stability at high temperature such that an electrolytic solution can pass smoothly through the separator.

A hydroxide-based inorganic flame retardant is a flame retardant that absorbs heat at a certain temperature and is used in various resins and the like. The hydroxide-based inorganic flame retardant releases water when it absorbs heat. In the case in which the released water reacts with ions in a battery, particularly Li ions, there is a high possibility of explosion. Therefore, attention should be drawn to use in lithium secondary batteries.

KR 2012-0079515A relates to an electrode assembly including an asymmetrically coated separator and an electrochemical device including the same. KR 2012-0079515A discloses, in an electrode assembly, which is comprised by alternatively laminating a plurality of: anode units comprising an anode collector, anode active material layers coated on both sides of the anode collector, and a separator attached to one side of the anode collector; and cathode units comprising a cathode collector, cathode active material layers coated on both sides of the cathode collector, and a separator attached to one side of the cathode collector; the electrode assembly comprising an asymmetrically coated separator, wherein one side thereof, attached to each active material in the anode unit or the cathode unit, and the other side thereof are asymmetrically coated with an adhesive-power reinforcing member and a heat-resistance reinforcing member, respectively. In a portion of KR 2012-0079515A, the hydroxide inorganic flame retardant may be asymmetrically coated only on the anode. However, KR 2012-0079515A fails to recognize the problem caused by the release of water. In addition, it does not recognize the effect of asymmetry of the coating weight of the separator itself.

JP 2006-269359A discloses a separator for a non-aqueous electrolyte secondary battery, wherein the separator for a non-aqueous electrolyte secondary battery comprises a laminated body with at least two layers laminated, of which at least one has a shutdown temperature of 140° C. or less, and at least one layer has a heat deformation temperature (JIS K 7207 A method) of 100° C. or more, with an oxygen index (JIS K 7201) of a layer facing a cathode of 26 or more.

In JP 2006-269359A, a layer facing the cathode of the separator comprises a material mainly composed of polyolefin, and a layer facing the anode of the separator comprises a fluorine resin, an inorganic compound and a flame retardant. As JP 2006-269359A does not include an inorganic particle layer, the separator in JP 2006-269359A has poor shrink resistance by heat than other separators.

KR 2015-0019991A discloses a lithium secondary battery, comprising a positive electrode, a negative electrode, and a separator interposed between the positive electrode and the negative electrode, wherein the separator comprises a substrate including a first surface facing the negative electrode and a second surface facing the positive electrode; a first layer disposed on the first surface of the substrate and including an organic material; and a second layer disposed on the second surface of the substrate and including an inorganic material. The separator of KR 2015-0019991A is different from the present invention in that it does not include an inorganic coating layer.

As described above, a technology, that is capable of preventing the risk of lithium ions mainly precipitated in a negative electrode in a lithium secondary battery, enhancing the flame retardant effect, and maintaining electrochemical properties compared with a conventional inorganic coating separator, has not yet been suggested.

DISCLOSURE

Technical Problem

The present invention has been made in view of the above problems, and it is an object of the present invention to provide a separator, in which is capable of preventing the risk of lithium ions mainly precipitated in a negative electrode in a lithium secondary battery, enhancing the flame retardant effect, and maintaining electrochemical properties compared with a conventional inorganic coating separator, and a lithium secondary battery including the same.

Technical Solution

In a first aspect of the present invention, the above and other objects can be accomplished by the provision of a separator, comprising a separator substrate including a polyolefin-based material a first coating layer, including a flame retardant material, disposed on a first surface of the separator substrate facing a positive electrode, and a second coating layer, including at least one selected from the group consisting of a binder material and inorganic particles, disposed on a second surface of the separator substrate facing a negative electrode.

The weight of the first coating layer $W_1$ is equal to or greater than the weight of the second coating layer $W_2$, and the weight of the first coating layer $W_1$ and the weight of the second coating layer $W_2$ satisfy the following relationships.

$$0.51 < W_1/(W_1+W_2) < 0.95$$

$$7 \text{ g/m}^2 < (W_1+W_2)$$

The flame retardant material is a hydroxide inorganic flame retardant, particularly at least one selected from among $Al(OH)_3$, $Mg(OH)_2$, $AlOOH$, and $CaO.Al_2O_3.6H_2O$.

The inorganic particles are high-dielectric inorganic particles having a dielectric constant of 1 or higher, inorganic particles having piezoelectricity, inorganic particles having lithium ion transfer ability, or a mixture of two or more thereof. Particularly, the inorganic particles are at least one selected from a group consisting of $Al_2O_3$, $SiO_2$, MgO, $TiO_2$ and $BaTiO_2$.

The binder material is at least one selected from a group consisting of polyvinylidene fluoride (PVdF), polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), tetrafluoroethylene (TFE), fluoro rubber, and polyimide. Particularly, the binder material is at least one selected from a group consisting of PVdF, TFE, and polyimide.

In a second aspect of the present invention, there is provided an electrochemical device comprising the separator, wherein the electrochemical device is a battery, in which the charge and discharge cycle characteristics of the battery at 35° C. or more and 50° C. or less are identical to those of a battery comprising a separator having the second coating layer disposed on both surfaces of the separator.

Advantageous Effects of Invention

A separator according to the present invention is advantageous in that it is capable of (1) preventing the risk of lithium ions mainly precipitated in a negative electrode in a lithium secondary battery, (2) enhancing the flame retardant effect, and (3) maintaining similar electrochemical properties compared with those of a conventional inorganic coating separator.

BEST MODE

Hereinafter, the present invention will be described in detail. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method. Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

In accordance with an aspect of the present invention, there is provided a separator, comprising a separator substrate including a polyolefin-based material a first coating layer including a flame retardant material, disposed on a first surface of the separator substrate facing a positive electrode, and a second coating layer including a binder material or inorganic particles, disposed on a second surface of the separator substrate facing a negative electrode.

The weight of the first coating layer $W_2$ is equal to or greater than the weight of the second coating layer $W_2$, and the weight of the first coating layer $W_2$ and the weight of the second coating layer $W_2$ satisfy the following relationships.

$$0.51 < W_1/(W_1+W_2) < 0.95$$

$$7 \text{ g/m}^2 < (W_1+W_2)$$

The flame retardant material is a hydroxide inorganic flame retardant, particularly the flame retardant material is at least one selected from among $Al(OH)_3$, $Mg(OH)_2$, $AlOOH$, and $CaO.Al_2O_3.6H_2O$.

1) Characteristics of Separator

In a lithium secondary battery, precipitation of lithium ions mainly occurs in a negative electrode, the flame retardant effect can be achieved by coating of a hydroxide-based inorganic flame retardant capable of generating moisture only on a surface of separator facing a positive electrode, whereby it is possible to prevent reaction between the precipitated lithium and moisture.

Then, a binder for forming an adhesive layer or a conventional alumina-based SRS may be coated on a surface of separator facing a negative electrode, which is the opposite side. In order to enhance the flame retardant effect, however, it is effective to have such that the thickness of coating on the surface facing the positive electrode is greater than the thickness of coating on the surface facing the negative electrode.

The overall thickness of the separator according to the present invention is similar to that of a conventional separator coated with an inorganic material on surfaces facing a positive electrode and a negative electrode. The thickness of the separator may range from 5 µm to 30 µm. In the case in which the thickness of the separator is less than 5 µm, the strength of the separator is low, whereby the separator may be easily damaged, which is undesirable. In the case in which the thickness of the separator is greater than 30 µm, the overall thickness of the electrode assembly is increased, whereby the capacity of the battery may be reduced, which is also undesirable.

The charge and discharge characteristics of a battery including the separator according to the present invention at 35° C. or more and 50° C. or less are identical to those of a battery including the conventional separator having both surfaces coated with the inorganic material. In the case in which the temperature is 35° C. or less, the effect based on the temperature cannot be distinguished. In the case in which the temperature is 50° C. or more, the conventional separator having both surfaces coated with the inorganic material has inferior thermal stability to the separator according to the present invention.

2) Weight of Coating Layer

In accordance with the present invention, the weight of the first coating layer $W_1$ is equal to or greater than the weight of the second coating layer $W_2$, and the weight of the first coating layer $W_1$ and the weight of the second coating layer $W_2$ satisfy the following relationships.

$$0.51 < W_1/(W_1+W_2) < 0.95$$

Preferably, $0.6 < W_1/(W_1+W_2) < 0.95$

More preferably, $0.65 < W_1/(W_1+W_2) < 0.95$

Most preferably, $0.7 < W_1/(W_1+W_2) < 0.95$

Even in the case of the asymmetric separator according to the present invention, in order to maintain the flame retardant performance even in the case of serious damage such as nail penetration, the coating amount is required to be 7 g/m² or more. It can be seen that the flame retardant performance is excellent in the case in which the coating amount is asymmetric although the coating amount satisfies the minimum.

3) Flame Retardant Material

The flame retardant material according to the present invention is a hydroxide inorganic flame retardant, particularly the flame retardant material is at least one selected from among $Al(OH)_3$, $Mg(OH)_2$, $AlOOH$, and $CaO.Al_2O_3.6H_2O$. The flame retardant acts as a flame retardant represented by the following chemical formulas.

2Al(OH)$_3$→Al$_2$O$_3$+3H$_2$O (mainly at 180~300° C., −280 cal/g (−1172 kJ/kg))

Mg(OH)$_2$→MgO+H$_2$O (mainly at 300~400° C., −328 cal/g (−1372 kJ/kg))

3CaO.Al$_2$O$_3$.6H$_2$O→Al$_2$O$_3$+3CaO+6H$_2$O (mainly at 250° C., −340 cal/mol)

4) Inorganic Particles

The inorganic particles according to the present invention may form empty spaces among the inorganic particles, and thereby may form micro pores and maintain a physical shape as a spacer. The physical characteristics of the inorganic particles are not generally changed at a temperature of 200° C. or more.

The inorganic particles are not particularly restricted, as long as the inorganic particles are electrochemically stable. In other words, the inorganic particles that may be used in the present invention are not particularly restricted as long as the inorganic particles are not oxidized and/or reduced within the operating voltage range (e.g. 0 to 5 V based on Li/Li$^+$) of a battery to which the inorganic particles are applied. Particularly, in the case in which inorganic particles having high electrolyte ion transfer ability are used, it is possible to improve the performance of an electrochemical device. Consequently, it is preferable for the electrolyte ion transfer ability of the inorganic particles to be as high as possible. In addition, in the case in which the inorganic particles have high density, it may be difficult to disperse the inorganic particles at the time of forming the porous separator, and the weight of a battery may increase at the time of manufacturing the battery. For these reasons, it is preferable for the density of the inorganic particles to be low. In addition, in the case in which the inorganic particles have high permittivity, the degree of dissociation of electrolyte salt, such as lithium salt, in a liquid electrolyte may increase, thereby improving the ion conductivity of the electrolytic solution.

For the reasons described above, the inorganic particles may be high-dielectric inorganic particles having a dielectric constant of 1 or more, preferably 10 or more, inorganic particles having piezoelectricity, inorganic particles having lithium ion transfer ability, or a mixture of two or more thereof.

Examples of the inorganic particles having a dielectric constant of 1 or more may include $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or a mixture thereof. However, the present invention is not limited thereto.

The inorganic particles having piezoelectricity are a material that is a nonconductor at normal pressure but, when a predetermined pressure is applied thereto, exhibits conductivity due to a change in the internal structure thereof. In the case in which the inorganic particles have a high dielectric value, e.g. a dielectric constant of 100 or more, and the inorganic particles are tensioned or compressed with a predetermined pressure, electric charges are generated. One face is charged as a positive pole and the other face is charged as a negative pole, whereby a potential difference is generated between these faces.

In the case in which inorganic particles having the above-mentioned characteristics are used, a short circuit may occur in both electrodes in the event of an external impact, such as local crushing or an impact with a nail. At this time, however, the positive electrode and the negative electrode may not directly contact each other due to the inorganic particles coated on the porous separator, and potential differences in particles may occur due to the piezoelectricity of the inorganic particles. Accordingly, electron migration, namely, fine current flow, is achieved between the two electrodes, whereby the voltage of the battery is gradually reduced, and therefore the stability of the battery may be improved.

Examples of the inorganic particles having piezoelectricity may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT) hafnia ($HfO_2$), and a mixture thereof. However, the present invention is not limited thereto.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, lithium ionic conductivity in the battery may be improved, and therefore the battery performance may be improved.

Examples of the inorganic particles having lithium ion transfer ability may include lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), (LiAlTiP)$_xO_y$-based glass (where $0<x<4$ and $0<y<13$) such as 14Li$_2$O-9Al$_2$O$_3$-38TiO$_2$-39P$_2$O$_5$, lithium lanthanum titanate (Li$_x$La$_y$TiO$_3$, where 0<x<2 and 0<y<3), lithium germanium thiophosphate (Li$_x$Ge$_y$P$_z$S$_w$, where 0<x<4, 0<y<1, 0<z<1, and 0<w<5) such as Li$_{3.25}$Ge$_{0.25}$P$_{0.75}$S$_4$, lithium nitride (Li$_x$N$_y$, where 0<x<4 and 0<y<2) such as Li$_3$N, SiS$_2$-based glass (Li$_x$Si$_y$S$_z$, where 0<x<3, 0<y<2, and 0<z<4) such as Li$_3$PO$_4$—Li$_2$S—SiS$_2$, P$_2$S$_5$-based glass (Li$_x$P$_y$S$_z$, where 0<x<3, 0<y<3, and 0<z<7) such as LiI—Li$_2$S—P$_2$S$_5$, and a mixture thereof. However, the present invention is not limited thereto.

In the case in which the inorganic particles having high permittivity, the inorganic particles having piezoelectricity, and the inorganic particles having lithium ion transfer ability are used together, the effects obtained through these ingredients may be further improved.

The size of each of the inorganic particles is not particularly restricted. In order to form a film having a uniform thickness and to achieve appropriate porosity, however, each of the inorganic particles may have a size of 0.001 μm to 10 μm. In the case in which the size of each of the inorganic particles is less than 0.001 μm, dispersibility is reduced, whereby it is difficult to adjust the physical properties of the porous separator. In the case in which the size of each of the inorganic particles is greater than 10 μm, the thickness of a separator manufactured with the same content of a solid body is increased, whereby the mechanical properties of the separator are deteriorated. In addition, a short circuit may easily occur in the battery when the battery is charged and discharged due to excessively large-sized pores.

5) Binder

The binder may also be commonly referred to as a polymer binder and may become a gel when the binder is impregnated with a liquid electrolytic solution, whereby the binder may have a characteristic of exhibiting high rate of electrolytic solution impregnation. In fact, in the case in which the polymer binder is a polymer having a high rate of electrolytic solution impregnation, an electrolytic solution injected after the assembly of a battery permeates into the polymer, and the polymer impregnated with the electrolytic solution exhibits electrolyte ion transfer ability. In addition, compared to a conventional hydrophobic polyolefin-based separator, wetting of the porous separator in the electrolytic solution may be improved, and it is possible to use polar electrolytic solutions for batteries, which has been difficult conventionally. Consequently, the binder may have a polymer with solubility parameter of 15 MPa$^{1/2}$ to 45 MPa$^{1/2}$, preferably 15 MPa$^{1/2}$ to 25 MPa$^{1/2}$ and 30 MPa$^{1/2}$ to 45 MPa$^{1/2}$. In the case in which the solubility parameter of the binder is less than 15 MPa$^{1/2}$ and greater than 45 MPa$^{1/2}$, it is difficult to impregnate the binder with a conventional electrolytic solution for batteries.

Specifically, the binder may be at least one selected from the group consisting of polyvinylidene fluoride, polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), TFE, fluoro rubber, and polyimide. Preferably, the binder may be at least one selected from the group consisting of PVdF, TFE and polyimide.

The binder material may further comprise at least one selected from among tannic acid, pyrogallic acid, amylose, amylopectin, and xanthan gum. Such a binder material includes a large amount of OH groups, thereby enhancing the adhesive strength of the binder-inorganic material and the substrate-binder. At the same time, it may prevent a short circuit in a battery through self-healing function against partial damage to the separator, improve the adhesion between the separator and the positive electrode and between the separator and the negative electrode, and cope with elution of the positive electrode material transition metal.

6) Construction and Application of Electrode Assembly

The present invention also provides an electrochemical device including a positive electrode, a negative electrode, the separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 m. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may include stainless steel, aluminum, nickel, titanium, or plastic carbon. Alternatively, the positive electrode current collector may include aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide (LiCoO$_2$) or a lithium nickel oxide (LiNiO$_2$), or a compound substituted with one or more transition metals; a lithium manganese oxide represented by the chemical formula Li$_{1+x}$Mn$_{2-x}$O$_4$ (where x=0 to 0.33) or a lithium manganese oxide, such as LiMnO$_3$, LiMn$_2$O$_3$, or LiMnO$_2$; a lithium copper oxide (Li$_2$CuO$_2$); a vanadium oxide, such as LiV$_3$O$_8$, V$_2$O$_5$, or Cu$_2$V$_2$O$_7$; an Ni-sited lithium nickel oxide represented by the chemical formula LiNi$_{1-x}$M$_x$O$_2$ (where M=Co, Mn, Al, Cu, Fe, Mg, B, or Ga, and x=0.01 to 0.3); a lithium manganese composite oxide represented by the chemical formula LiMn$_{2-x}$M$_x$O$_2$ (where M=Co, Ni, Fe, Cr, Zn, or Ta, and x=0.01 to 0.1) or the chemical formula Li$_2$Mn$_3$MO$_8$ (where M=Fe, Co, Ni, Cu, or Zn); LiMn$_2$O$_4$ having Li of a chemical formula partially replaced by alkaline earth metal ions; a disulfide compound; or Fe$_2$(MoO$_4$)$_3$.

The conductive agent is generally added in an amount of 1 to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause any chemical change in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may include copper, stainless steel, aluminum, nickel, titanium, or plastic carbon. Alternatively, the negative electrode current collector may include copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; or a Li—Co—Ni based material.

In accordance with another aspect of the present invention, there is provided a battery pack including the electrochemical device.

Particularly, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and an energy storage system. However, the present invention is not limited thereto.

The structure and manufacturing method of the device are well known in the art to which the present invention pertains, and a detailed description thereof will be omitted.

DESCRIPTION OF EMBODIMENTS

Hereinafter, the present invention will be described in detail with reference to the following examples and experimental examples; however, the present invention is not limited by the examples and the experimental examples. The examples may be modified into various other forms, and the scope of the present invention should not be interpreted as being limited by the examples, which will be described in detail. The examples are provided in order to more completely explain the prevent invention to a person who has average knowledge in the art to which the present invention pertains.

(Manufacturing of Separator)

For the purpose of Examples according to the present invention, separators of the following Comparative Examples and Examples were manufactured. When a slurry was prepared, the inorganic material, the binder and the solvent were mixed at a mass ratio of 14.4 Wt %, 3.6 Wt % and 82 Wt %, respectively. More specifically, the slurry was prepared such that the inorganic material and the binder were mixed so that a ratio of the inorganic material and the binder after drying was 80 Wt % and 20 Wt %, respectively.

TABLE 1

| Type | Substrate PE Comparative Example 1 | SRS Symmetrical surfaces Comparative Example 2 | Asymmetrical surfaces Example 1 | Asymmetrical surfaces Example 2 |
| --- | --- | --- | --- | --- |
| Coating layer Facing positive electrode | | $Al_2O_3$ | $Al(OH)_3$ | $Al(OH)_3$ |
| Facing negative electrode | | $Al_2O_3$ | $Al_2O_3$ | $Al_2O_3$ |
| Facing positive electrode/Facing negative electrode | 0 | 6.75/6.75 | 6.75/6.75 | 10/3.5 |

(Comparison of Flame Retardant Properties of Separator)

Figure 1:
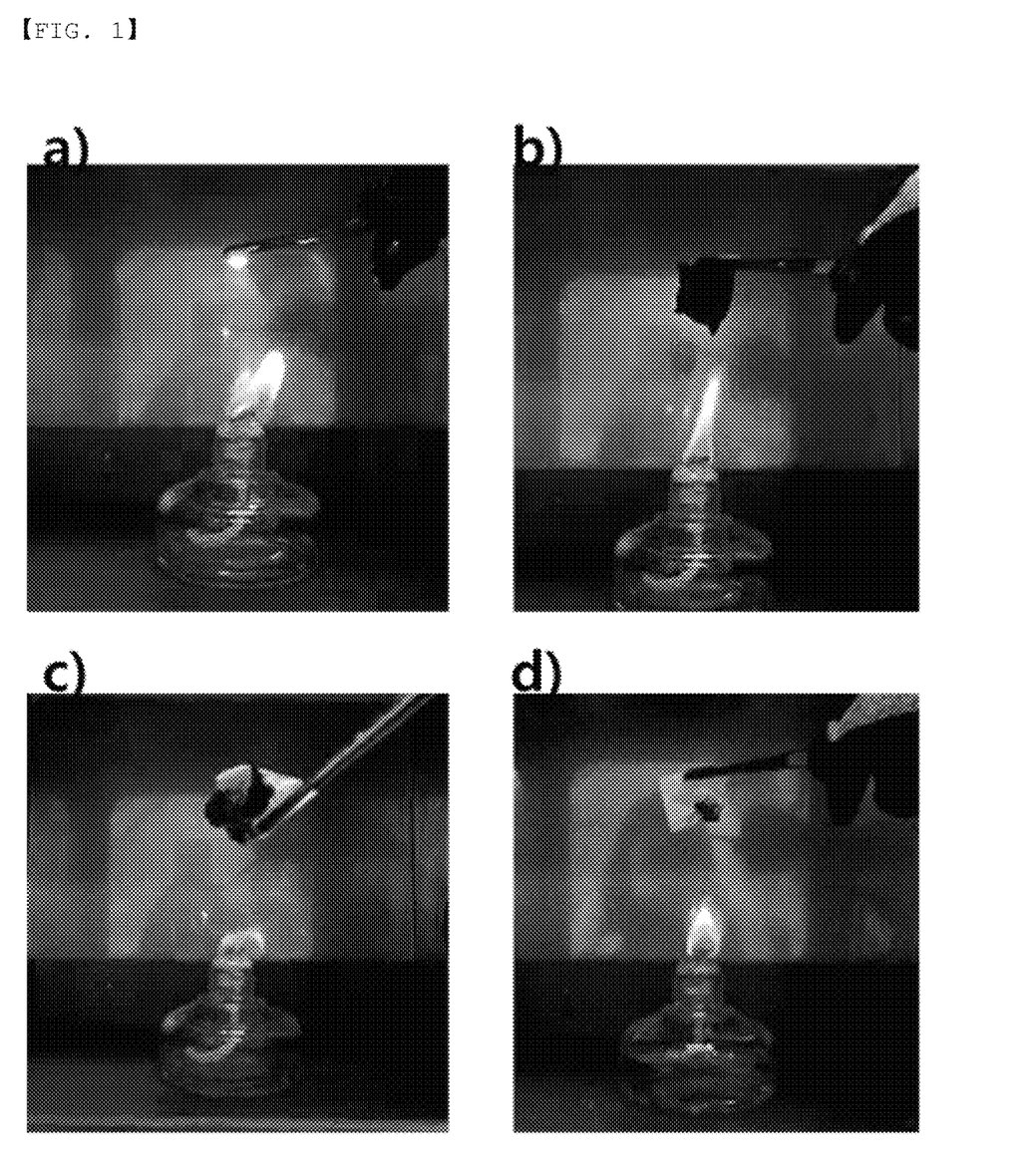
FIG. 1 shows photographs of combustion characteristics of Comparative Examples and Examples according to the present invention.

In order to investigate the flame retardant properties of Examples 1 and 2 and Comparative Examples 1 and 2 according to the present invention, four 5 cm×5 cm samples of each separator were lighted using an alcohol lamp and the changes were observed. The results are shown in FIG. 1. As shown in FIG. 1, a), b), c), and d) are the results of Comparative Example 1, Comparative Example 2, Example 1, and Example 2, respectively. Comparative Example 1 showed rapid thermal shrinkage at the start of fire. The degree of shrinkage was so severe that it was difficult to observe the degree of diffusion of the fire. After combustion, Comparative Example 1 was all melted down and it was not possible to recognize the shape. In Comparative Example 2, the degree of shrinkage compared to the pure substrate was good. However, after the fire, the spreading rate of the fire was very fast, and only the burned and blackened form was observed. Examples 1 and 2 also showed a good degree of shrinkage compared to the pure substrate. Unlike Comparative Examples, Examples 1 and 2 were observed that the spreading of the fire proceeded slowly even after the fire. Example 1 was observed to be self-extinguishing in some samples, while Example 2 was observed to be self-extinguishing in most of the samples.

(Measurement of Safety of Battery Including Separator)

Batteries were manufactured using the separators according to Comparative Example 2, Example 1 and Example 2, and then nail penetration tests were performed on the batteries. In the case of Comparative Example 2, the surface temperature of the battery rose to 650° C., indicating that the safety of the battery was very poor. On the other hand, in Examples 1 and 2 according to the present invention, it was confirmed that the Examples 1 and 2 showed excellent flame retardant performance by maintaining the surface temperature of the battery at 60° C. and 40° C., respectively. As a result of disassembling each battery, it was observed that all of the inner substrate was melted and the pores of the substrate itself were all gone. Therefore, it can be assumed that the internal temperatures of Examples 1 and 2 also rose to 135° C. or more, which is the melting point of PE. Nevertheless, it has been confirmed that the battery with the flame retardant added according to the present invention was very stable even for very serious damage such as nail penetration by maintaining the external temperature very stable.

In addition, the safety of the battery was measured by varying the total coating amount of the asymmetric separator and the amount of asymmetric coating of the asymmetric separator. The temperature was 25° C., the nail diameter was 3 mm, and the slope was 30 degree. The speed through the nail was 80 mm/sec. The following table shows the result of Example 3 for this measurement. $Al_2O_3$ was used for the negative electrode and $Al(OH)_3$ was used for the positive electrode.

TABLE 2

| Ratio of | Total loading (g/m$^2$) | | | | |
| --- | --- | --- | --- | --- | --- |
| $Al_2O_3$:$Al(OH)_3$ | 5 | 7 | 10 | 15 | 20 |
| 1:0 | Fail | Fail | Fail | Fail | Fail |
| 1:1 | — | Fail | Pass | Pass | Pass |
| 1:2 | Fail | Fail | — | — | — |
| 1:3 | — | Pass | — | — | — |
| 1:4 | Fail | — | — | — | — |

As can be seen from the above, even in the case of asymmetric separator, it can be seen that 7 g/m$^2$ or more of the coating amount was required in order to maintain the flame retardant performance even in the case of severe damage such as nail penetration. In addition, it can be seen that the flame retardant performance is excellent in the case of asymmetric separator, even though the coating amount satisfies the minimum.

(DSC Measurement of Separator Having Flame Retardant Inorganic Material)

Figure 2:
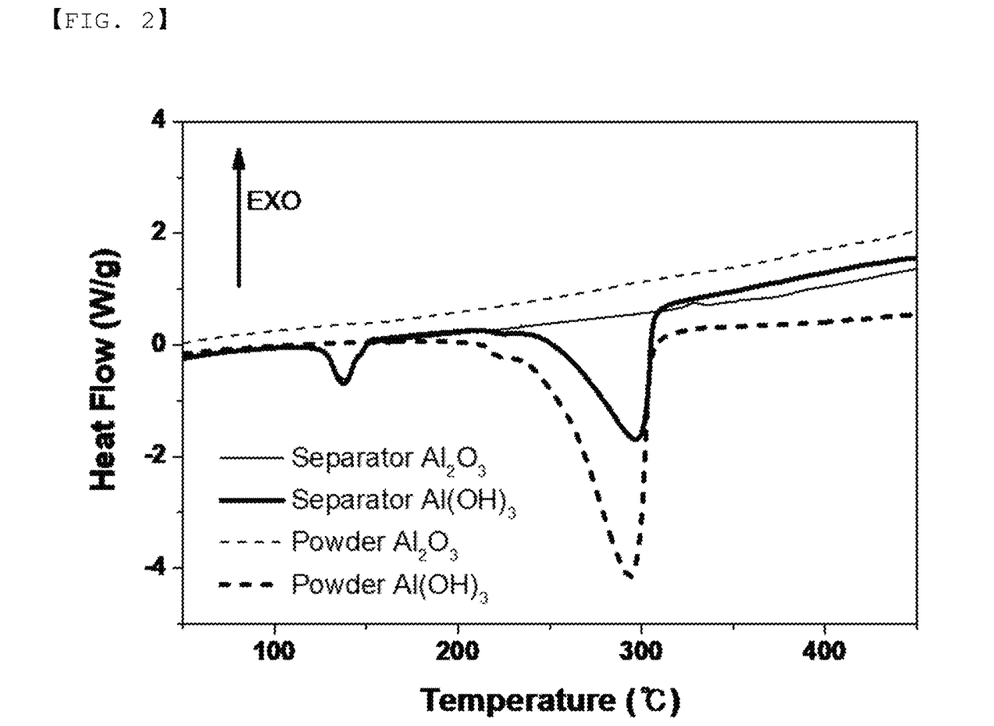
FIG. 2 is a graph showing the results of DSC measurement of a flame retardant inorganic matter, inorganic particles, a separator including a flame retardant inorganic matter, and a separator including inorganic particles.

In order to perform a DSC measurement of a separator having a flame retardant inorganic material, pure $Al_2O_3$ and $Al(OH)_3$ particles and separators having coated with $Al_2O_3$ and $Al(OH)_3$ were prepared and their DSC measurements were performed. The results are shown in FIG. 2. It can be seen from FIG. 2 that the endothermic peak, which was not observed at the time of application of $Al_2O_3$, was observed at about 200° C. to 300° C., whereby the flame retardancy properties of the separator according to the present invention were confirmed.

(Evaluation of Battery Cycle Including Separator with Flame Retardant Inorganic Material)

A battery cycle including the separator having the flame retardant inorganic material according to the present invention was evaluated. The separators of Comparative Example 2, Example 1, and a separator of Comparative Example 3, in which $Al(OH)_3$ was coated on both surfaces facing a positive electrode and a negative electrode, were manufactured and then batteries including the same were manufactured. The cycle characteristics were measured at different temperatures.

Figure 3:
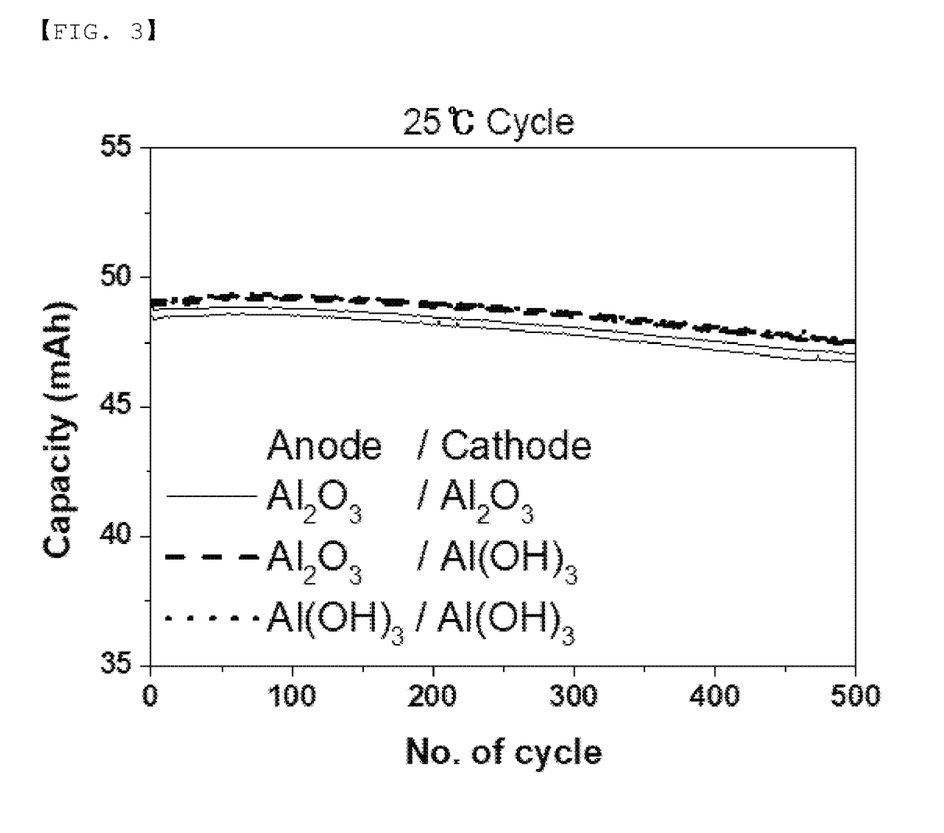
FIG. 3 is a graph showing the results of measurement of charge and discharge characteristics at 25° C. of batteries including separators according to the Comparative Examples and Examples according to the present invention.
Figure 4:
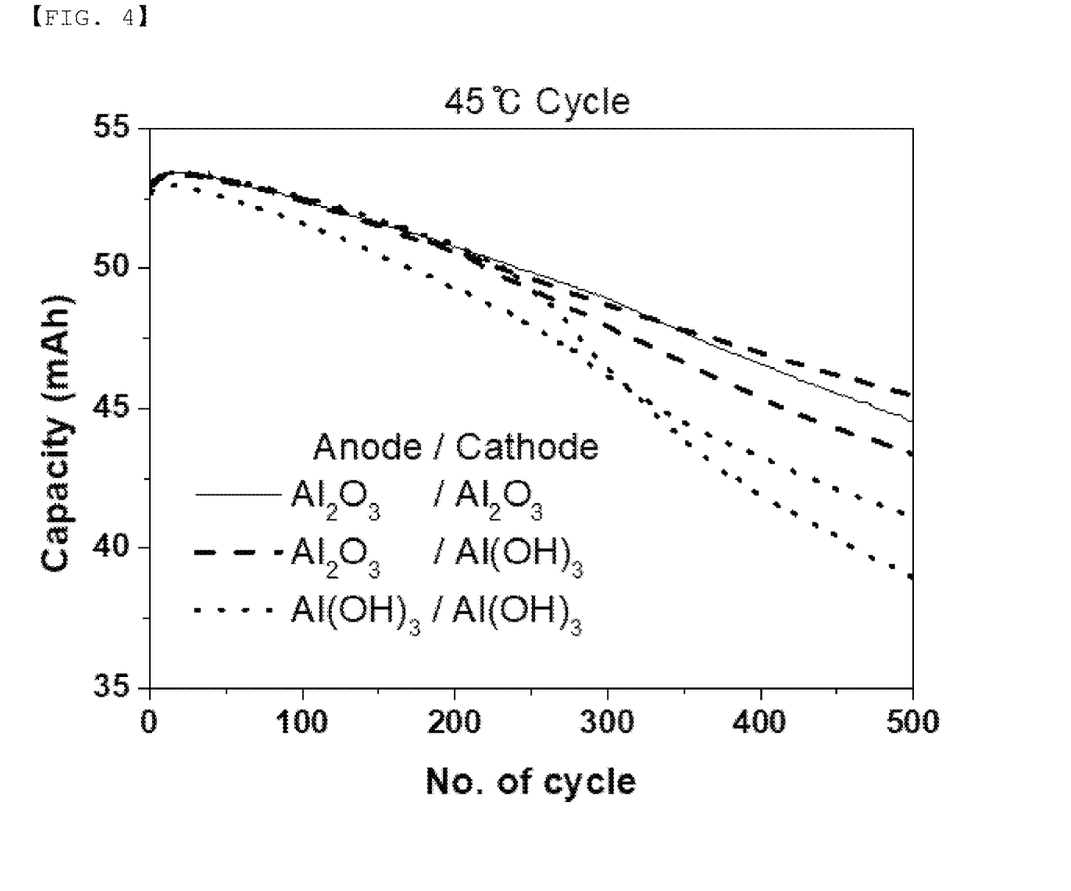
FIG. 4 is a graph showing the results of measurement of charge and discharge characteristics at 45° C. of batteries including separators according to the Comparative Examples and Examples according to the present invention.

FIG. 3 shows the cycle characteristics at 25° C. and FIG. 4 shows the cycle characteristics at 45° C. In the case in which the inorganic flame retardant was applied to both surfaces, it exhibited the equivalent level as Comparative Example 1 at a room temperature of 25° C., while it exhibited inferior cycle characteristics over 300 cycles at 45° C., which is a high temperature. This is because the water was generated from the inorganic flame retardant used in the negative electrode and then the water caused a chemical reaction with the lithium ion. It can be seen that the life characteristics of Comparative Example 1 can be guaranteed in the case in which the inorganic flame retardant is applied only to the surface facing the positive electrode. As a result, it is apparent that the asymmetric separator of the present invention blocks the water generated from the flame retardant material from the negative electrode lithium ion while maintaining the flame retardant property.

(Evaluation of Resistance of Separator Having Flame Retardant Inorganic Material)

The resistance of the separator was measured under the same conditions as in Example 3 above. In the case in which only pure substrate was used, the resistance of the separator was 0.38Ω. The following table shows the resistance of the separator to the coating amount and the degree of asymmetry, respectively.

TABLE 3

| Ratio of | Total loading (g/m$^2$) | | | | |
| --- | --- | --- | --- | --- | --- |
| $Al_2O_3$:$Al(OH)_3$ | 5 | 7 | 10 | 15 | 20 |
| 1:0 | 0.50 | 0.75 | 0.90 | 1.20 | 1.60 |
| 1:1 | — | 0.79 | 1.02 | 1.28 | 1.70 |
| 1:2 | 0.58 | 0.83 | 1.10 | 1.35 | 1.82 |
| 1:3 | — | 0.87 | 1.15 | 1.41 | 1.95 |
| 1:4 | 0.71 | 0.91 | 1.18 | 1.50 | 2.05 |

As can be seen from the above table, the asymmetric separator according to the present invention has a surface resistance determined by the total coating amount. In addition, it can be seen that the asymmetric separator according to the present invention has a higher surface resistance value in the case in which the inorganic material has a large amount of $Al(OH)_3$.

The invention claimed is:

1. A separator comprising:
a separator substrate comprising a polyolefin-based material;
a first coating layer, comprising a flame retardant material, disposed on a first surface of the separator substrate facing a positive electrode, and
a second coating layer, comprising a binder material and optionally inorganic particles, disposed on a second surface of the separator substrate facing a negative electrode,
wherein the binder material comprises at least one first binder selected from the group consisting of polyvinylidene fluoride (PVdF), polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), tetrafluoroethylene (TFE), fluoro rubber, and polyimide, and
at least one second binder selected from the group consisting of tannic acid, pyrogallic acid, amylose, amylopectin, and xanthan gum.

2. The separator according to claim 1, wherein a weight of the first coating layer $W_1$ is equal to or greater than a weight of the second coating layer $W_2$.

3. The separator according to claim 2, wherein the weight of the first coating layer $W_1$ and the weight of the second coating layer $W_2$ satisfy the following relationships:

$$0.51 < W_1/(W_1+W_2) < 0.95$$

$$7 \text{ g/m}^2 < (W_1+W_2).$$

4. The separator according to claim 1, wherein the flame retardant is a hydroxide inorganic flame retardant.

5. The separator according to claim 4, wherein the hydroxide inorganic flame retardant is at least one selected from the group consisting of $Al(OH)_3$, $Mg(OH)_2$, AlOOH, and $CaO \cdot Al_2O_3 \cdot 6H_2O$.

6. The separator according to claim 1, wherein the inorganic particles are present and are high-dielectric inorganic particles having a dielectric constant of 1 or higher, inorganic particles having piezoelectricity, inorganic particles having lithium ion transfer ability, or a mixture of two or more thereof.

7. The separator according to claim 6, wherein the inorganic particles are at least one selected from the group consisting of $Al_2O_3$, $SiO_2$, MgO, $TiO_2$ and $BaTiO_2$.

8. The separator according to claim 1, wherein the first binder material is at least one selected from the group consisting of PVdF, TFE, and polyimide.

9. An electrochemical device comprising the separator according to claim 1.

10. The electrochemical device according to claim 9, wherein the electrochemical device is a battery, wherein charge and discharge cycle characteristics of the battery at 35° C. or more and 50° C. or less are identical to charge and discharge cycle characteristics of a battery comprising a separator having the second coating layer disposed on both surfaces of the separator.

11. A battery comprising:
a positive electrode;
a negative electrode; and
a separator comprising:
a separator substrate comprising a polyolefin-based material;
a first coating layer, comprising a flame retardant material, disposed on the first surface of the separator substrate facing the positive electrode, and
a second coating layer, comprising a binder material and optionally inorganic particles, disposed on a second surface of the separator substrate facing the negative electrode,
wherein the binder material comprises at least one first binder selected from the group consisting of polyvinylidene fluoride (PVdF), polyvinylidene fluoride-hexafluoropropylene, polyvinylidene fluoride-trichloroethylene, polyvinylidene fluoride-chlorotrifluoroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, ethylene-propylene-diene terpolymer (EPDM), sulfonated EPDM, styrene butadiene rubber (SBR), tetrafluoroethylene (TFE), fluoro rubber, and polyimide, and
at least one second binder selected from the group consisting of tannic acid, pyrogallic acid, amylose, amylopectin, and xanthan gum.

* * * * *